(12) United States Patent
Kocis

(10) Patent No.: US 6,269,449 B1
(45) Date of Patent: Jul. 31, 2001

(54) CAPACITIVE WAKE-UP MECHANISM FOR HAND HELD DATA ENTRY UNIT

(75) Inventor: Thomas J. Kocis, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 08/347,990

(22) Filed: Dec. 2, 1994

(51) Int. Cl.$^7$ .................................................. G06F 1/32
(52) U.S. Cl. ........................................................ 713/310
(58) Field of Search ........................... 395/750; 364/707; 271/2

(56) References Cited

U.S. PATENT DOCUMENTS

| | | | |
|---|---|---|---|
| 5,083,266 | * | 1/1992 | Watanabe ............................... 395/550 |
| 5,167,024 | * | 11/1992 | Smith et al. ........................... 395/375 |
| 5,230,074 | * | 7/1993 | Canova, Jr. et al. ................. 395/750 |
| 5,319,250 | * | 6/1994 | Windsor ................................... 271/2 |
| 5,380,983 | * | 1/1995 | Cavada et al. ........................ 219/250 |
| 5,396,443 | * | 3/1995 | Mese et al. ............................ 364/707 |
| 5,396,635 | * | 3/1995 | Fung ...................................... 395/800 |

\* cited by examiner

Primary Examiner—Paul R. Myers
(74) Attorney, Agent, or Firm—Haynes and Boone, L.L.P.

(57) ABSTRACT

Method and apparatus for transitioning an electronic device operable in a reduced power consumption mode from the reduced power consumption mode to a full power mode immediately before a user attempts to operate the device is disclosed. A hand held intelligent data entry unit (IDEU) of the present invention is provided with a noncontact sensor for detecting the prepense of a user's hand within an predefined actuation region of the IDEU while the IDEU is operating in a low power consumption mode. Responsive such detection, the sensor generates a wake up signal to a microprocessor of the IDEU for causing the IDEU to transition from the low power consumption mode to a full power mode.

22 Claims, 1 Drawing Sheet

CAPACITIVE WAKE-UP MECHANISM FOR HAND HELD DATA ENTRY UNIT

TECHNICAL FIELD

The invention relates generally to devices that are capable of operating in a reduced power consumption mode and, more particularly, for providing such devices with a non-contact sensor for use in causing the device to transition from the reduced power consumption mode to full power mode.

BACKGROUND OF THE INVENTION

Over the years, many attempts have been made to reduce the power consumption of battery powered electronic devices, thereby yielding longer battery operation. For obvious reasons, many of these attempts have focused on reducing the amount of power consumed by such devices while the device is on, but not in use. Hence, a reduction in power consumption has been achieved by slowing or stopping certain components of the device after the device or devices have been inactive for a predetermined period of time, which may or may not be set by the user. Clearly, therefore, it is critical to maintaining proper device performance accurately to determine when to slow or power down the device without disrupting the user's work, until further operation is needed.

For example, in the field of portable personal computers, when a computer's disk drive has not been accessed for a predetermined amount of time, for example, two minutes, the drive is powered down or caused to operate in a reduced power consumption mode, often referred to as "standby mode," such that the drive consumes less power, thereby reducing the overall power consumption of the computer. Thereafter, when a drive access is attempted, full power is reapplied to the drive and the drive spins up and is ready to be accessed.

Another example of a device capable of operation in a reduced power consumption mode is a device known as a radio mouse. Typically, after expiration of a predetermined amount of time in which the mouse has not been used, a microcontroller included in the mouse causes the mouse to operate in a reduced power consumption mode. This may be accomplished, for example, by writing the contents of a volatile memory device within the microcontroller, which is accessed by the microcontroller during operation of the mouse, to a nonvolatile memory device, which is slower than the microcontroller's volatile memory device. Power is then removed from the volatile memory device and is removed from or reduced to other components of the mouse. When the user is again ready to use the mouse, the user must move the mouse or click a mouse button provided thereon, at which point a signal is sent to wake up the mouse.

Although the above-described methods accomplish their primary goal, that is, to reduce in the amount of power consumed by the device, they suffer certain deficiencies, the most obvious of which is the time delay experienced by the user in waiting for the device to return to full power mode so that it can be used for its intended purpose. Referring to the disk drive example, the user must wait for power to be reapplied to the drive and the drive to spin up before access can be made thereto. With regard to the radio mouse, because the wake up signal is not sent until the user actually attempts to use the mouse to input data, the user may experience a delay of up to several seconds in inputting the data while the necessary operations for awakening the mouse are performed.

Hence, although it is possible for a user to wait for a device to return to full power state when he or she is again ready to use the device, it is not particularly desirable to require him or her to do so. On the other hand, there are inherent limits on the speed with which a device can be transitioned from a reduced power consumption to a full power mode.

Therefore, what is needed is a means for causing a device operating in a reduced power consumption mode to return to a full power mode immediately before the user is ready to use the device, such that the device has already returned to the full power mode by the time the user attempts to operate the device.

SUMMARY OF THE INVENTION

The foregoing problems are solved and a technical advance is achieved by a method and apparatus for transitioning an electronic device operable in a reduced power consumption mode from the reduced power consumption mode to a full power mode immediately before a user attempts to operate the device. In a departure from the art, a hand held intelligent data entry unit (IDEU) is provided with a noncontact sensor for detecting the presence of a user's hand within an actuation region of the IDEU during operation of the IDEU in the reduced power consumption mode and for sending a signal responsive to such detection for causing the IDEU to operate in full power mode.

In a preferred embodiment, the IDEU of the present invention comprises a microcontroller connected to one or more input devices, a nonvolatile memory device, a power supply comprising one or more batteries and a noncontact sensor, such as a capacitive sensor. In accordance with a feature of the present invention, the IDEU is operable in a full power, or active mode, in which all of the IDEU components are operating at normal levels, and in a reduced power consumption mode, in which the IDEU consumes significantly less power than it does during operation in the active mode. Accordingly, the microcontroller further includes a timeout timer, which, in the preferred embodiment, is a count-down timer that is initially set to expire after a predetermined amount of time, for example, 5 minutes, has elapsed and is reset responsive to input received by the microcontroller from one of the input devices. Upon the expiration of the predetermined amount of time without receipt of input from the devices, the timeout timer generates a "timeout" signal, causing the microcontroller to perform the operations necessary to place the IDEU in the reduced power consumption mode.

The capacitive sensor is arranged to detect the presence of a user's hand within a predefined "actuation region" of the IDEU and generate a "wake up" signal to the microcontroller responsive to the detection. The actuation region is ideally defined based on the amount of time required to wake up the computer, such that the IDEU can be caused to be ready to accept data via the input devices 22 as soon as the user picks up the IDEU.

A technical advantage achieved with the present invention is that it prevents the user from experiencing time delays typically associated with transitioning a device from a low power consumption mode to a full power mode.

A further technical advantage achieved with the present invention is that it can be used in connection with any number of different types of portable hand held electronic devices, such as intelligent remotes, radio mouses and the like.

DESCRIPTION OF THE PREFERRED EMBODIMENTS

Figure 1:
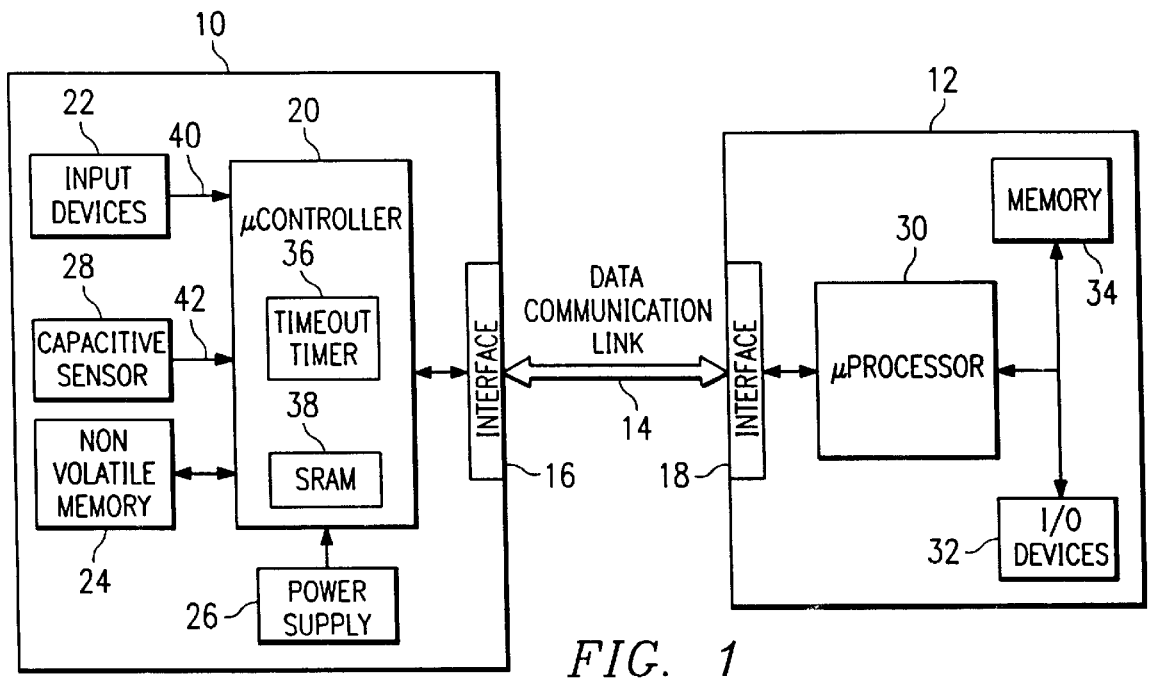
FIG. 1 is a block diagram of a host system and associated hand held intelligent data entry unit (IDEU) embodying features of the present invention.

Referring to FIG. 1, a hand held intelligent data entry unit (IDEU) embodying features of the present invention is designated by reference numeral 10. The IDEU 10 is connected to a host system 12, via a data communications link 14 and first and second interfaces 16 and 18, respectively, for receiving data from and transmitting data to the host system 12. In one embodiment, the data communications link 14 is a wireless link, such as a radio frequency (RF) or infrared (IR) link. In an alternative embodiment, the data communications link 14 is a physical link, such as a coaxial cable or other wiring means. In either case, it should be understood that the interfaces 16 and 18 will be of a type known in the art for enabling the selected mode of data transmission.

The IDEU 10 comprises a microcontroller 20 connected to one or more input devices, designated collectively by reference numeral 22, nonvolatile memory device 24, a power supply 26 comprising one or more batteries (not shown) and a capacitive sensor 28. The host system 12 comprises at least a microprocessor 30 connected to a plurality of I/O devices, designated collectively by reference numeral 32, and memory 34.

In accordance with a feature of the present invention, the WDEU 10 is operable in a full power, or active, mode, in which all of the IDEU 10 components are operating at normal levels, and in a reduced power consumption mode, in which the IDEU 10 consumes significantly less power than it does during operation in the active mode. Accordingly, the microcontroller 20 further includes a timeout timer 36 and volatile memory, such as a static random access memory (SRAM) 38. It should be understood that dynamic random access memory (DRAM) may also be used without departing from the scope of the present invention. In a preferred embodiment, the timeout timer 36 is a countdown timer that is initially set to expire after a predetermined amount of time, for example, 5 minutes, has elapsed and is reset responsive to input received by the microcontroller 20 from one of the input devices 22 via a line 40. As is typically the case with devices that are operable in a low power consumption mode, upon expiration of the predetermined amount of time without receipt of input from the devices 22, the timeout timer 36 generates a "timeout" signal. Responsive to the timeout signal, the microcontroller 20 performs the operations necessary to place the IDEU 10 in a reduced power consumption mode.

It should be understood that there are many methods known in the art for operating a device, such as the IDEU 10, in a reduced power consumption mode; however, in an illustrative embodiment, this may be at least partially accomplished by the microcontroller's 20 writing the contents of the SRAM 38 to the nonvolatile memory device 24 and then removing power from the SRAM 38, as well as other devices, if desired. The IDEU 10 remains in the reduced power consumption state until a "wake up" signal is received by the microcontroller 20 from the capacitive sensor 28 on a line 42, as will be described below.

In a preferred embodiment, the capacitive sensor 28 is configured to sense an increase in the voltage drop across a reference capacitor (not shown) resulting from the presence of a user's hand within a predefined "actuation region" of the IDEU 10 and generate a "wake up" signal to the microcontroller 20 when the sensed voltage drop exceeds a preset threshold voltage. The threshold voltage is selected based on the amount of time needed to perform the operations necessary to return the IDEU 10 to full power mode, such that the more time required to awaken the IDEU 20, which in the illustrative embodiment described above comprises at least reapplying power to the SRAM 38 and writing the contents of the nonvolatile memory device 24 back to the SRAM 38, the lower the threshold voltage should be set, thereby to allow more time to awaken the IDEU 20. In this manner, the IDEU 10 can be made ready to accept data via the input devices 22 as soon as the user picks up the IDEU 10.

In one embodiment, the IDEU 10 is a radio mouse, in which case the input devices 22 include a trackball and mouse keys. In alternative embodiments, the IDEU 10 is an intelligent remote control unit, in which case the input devices 22 comprise a plurality of keys or toggle switches, or a joystick or other known pointing device.

In an extension of the present invention, the wake up signal generated by the capacitive sensor 28 on the line 42 may also be transmitted to the microprocessor 30 of the host system 12 (via the interface 16, the data communications link 14 and the interface 18 to return the host system 12 to a full power mode from a reduced power consumption mode.

Figure 2:
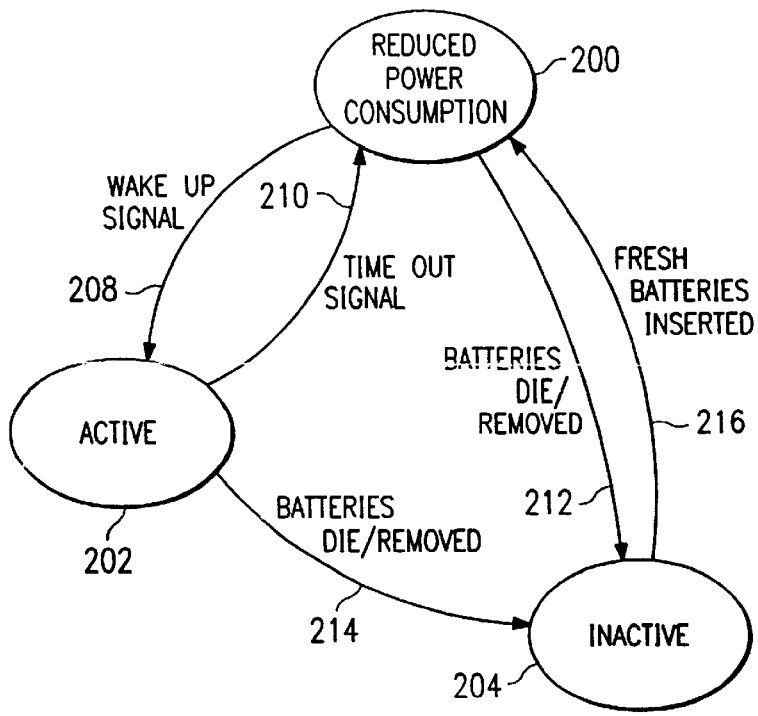
FIG. 2 is a state diagram of the operation of the IDEU of FIG. 1.

FIG. 2 is a state diagram of the operation of the IDEU 10 (FIG. 1). The IDEU 10 is operable in three states, including a reduced power consumption state 200, an active, or full power, state 202, and an inactive state 204, which corresponds to a condition of the IDEU 10 in which batteries (not shown) comprising the power supply 26 (FIG. 1) have been removed or are depleted.

In the preferred embodiment, the IDEU 10 powers up in and is reset to the reduced power consumption state 200, it being understood that this is a design choice only, and that the IDEU 10 could just as feasibly power up in and/or reset to the active state 202. When the IDEU 10 is in the reduced power consumption state 200 and the capacitive sensor 28 (FIG. 1) generates a wake up signal to the microcontroller 20 (FIG. 1), the IDEU 10 transitions to the active state 202, as indicated by an arrow 208. When the IDEU 10 is in the active state 202 and the timeout timer 36 (FIG. 1) generates a timeout signal, the IDEU 10 transitions to the reduced power consumption state 200, as indicated by an arrow 210. When the IDEU 10 is in either the reduced power consumption state 200 or the active state 202 and the batteries (not shown) comprising the power supply 26 are removed or depleted, the IDEU 10 transitions to inactive state 204, as indicated by arrows 212 and 214, respectively. When the IDEU 10 is in the inactive state 204 and fresh batteries are inserted, the IDEU 10 transitions to the reduced power consumption state 200, as indicated by an arrow 216.

It is understood that the present invention can take many forms and embodiments. The embodiments shown herein are intended to illustrate rather than to limit the invention, it being appreciated that variations may be made without departing from the spirit or the scope of the invention. For example, any number of different types of "noncontact sensors," including optical sensors, ultrasonic sensors, and passive infrared intrusion sensors, may be used in place of the capacitive sensor for sensing the approach of a user's hand toward the IDEU 10. In addition, the wake up signal generated by the capacitive sensor 28 may also be provided to the microprocessor 30 for transitioning the host system 12 from a reduced power consumption mode to a full power mode.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A hand-held data entry apparatus, responsive to the physical presence of a user of the apparatus, comprising:
   a processing unit which operates under control of an operating system;
   a power consumption circuit connected to said processing unit;
   means for effecting operation of said apparatus under a plurality of activity modes of operation including:
   a second power consumption mode wherein the power consumed by said apparatus supports active operation of said apparatus;
   a first power consumption mode, which decreases the power consumption of said apparatus from that consumed in said second mode;
   a third power consumption mode which decreases the power consumption of said apparatus from that consumed in said first mode;
   an activity monitor for monitoring the activity of said apparatus and for generating a plurality of control signals where each of said control signals indicates a different activity mode of said apparatus;
   power control means coupled to said activity monitor for receiving said control signals and in response to said control signals selecting and operating under one of said plurality of modes of operation;
   means for detecting the physical presence of a user within an actuation area of said apparatus;
   means for generating a first signal responsive to said detection; and
   means responsive to said first signal for causing said power control means to select a mode of operation for said apparatus independently of said control signals generated by said activity monitor, wherein said selected mode of operation results in an increase in power consumption of said apparatus.

2. The apparatus of claim 1 wherein said first and second power consumption modes comprise a low power consumption mode and a full power mode, respectively.

3. The noncontact wake up mechanism of claim 1 wherein said means responsive to said first signal comprises a microcontroller.

4. The apparatus of claim 1 wherein said means for detecting and generating comprises a capacitive sensor.

5. The apparatus of claim 1 wherein said means for detecting and generating comprises a noncontact sensor selected from the group consisting of an optical sensor, an ultrasonic sensor and a passive infrared intrusion sensor.

6. The apparatus of claim 1 further comprising:
   means for transmitting said first signal to a host system operating in a first power consumption mode to transition to a second power consumption mode.

7. A hand-held intelligent data entry unit ("IDEU") automatically operable in either a low power consumption mode or an active mode, the hand-held IDEU comprising:
   a microcontroller;
   a noncontact sensor for detecting the presence of a user's hand within a predefined actuation region of said hand-held IDEU while said hand-held IDEU is operating in said low power mode; and
   means responsive to said detection for generating a wake up signal to said microcontroller for causing said hand-held IDEU to operate in said active mode.

8. The hand-held IDEU of claim 7 further comprising at least one input device connected to said microcontroller for receiving user input.

9. The device of claim 8 wherein said microcontroller further comprises:
   a timeout timer for generating a timeout signal responsive to expiration of a predetermined time period in which no user input is received by said at least one input device while said battery powered electronic device is operating in said active mode; and
   means responsive to said timeout signal for causing said battery powered electronic device to operate in said low power consumption mode.

10. The hand-held IDEU of claim 9 further comprising a nonvolatile memory device connected to said microcontroller, wherein said microcontroller further comprises a volatile memory device and said means responsive to said timeout signal comprises means for writing contents of said volatile memory device to said nonvolatile memory device.

11. The hand-held IDEU of claim 7 wherein said noncontact sensor comprises a capacitive sensor.

12. The hand-held IDEU of claim 11 wherein said capacitive sensor comprises:
   means for measuring a voltage drop across a reference capacitor; and
   means for generating said wake up signal when said measured voltage drop exceeds a preset threshold voltage.

13. The hand-held IDEU of claim 12 wherein the value of said preset voltage determines a size of said actuation region.

14. The hand-held IDEU of claim 7 wherein said noncontact sensor comprises a sensor selected from the group consisting of an optical sensor, an ultrasonic sensor and a passive infrared intrusion sensor.

15. The hand-held IDEU of claim 7 further comprising means for transmitting said wake up signal to a microprocessor of a host system electrically connected to said hand-held IDEU for causing said host system to transition from a low power consumption mode to an active mode.

16. The hand-held IDEU of claim 7 further comprising a power supply for providing power to components thereof.

17. The hand-held IDEU of claim 16 wherein said power supply comprises at least one battery.

18. A method of operating a hand-held electronic data entry device, the method comprising:
   while preferentially operating said hand-held electronic data entry device in a first power consumption mode, detecting the presence of a user's hand within an actuation region surrounding said hand-held electronic data entry device;
   responsive to said detection, generating a wake up signal to a microcontroller of said hand-held electronic data entry device; and
   responsive to said wake up signal, causing said hand-held electronic data entry device to operate in a second power consumption mode;
   wherein said hand-held electronic data entry device consumes more power in said second power consumption mode than in said first power consumption mode.

19. The method of claim 18 wherein said first and second power consumption modes comprise a reduced power consumption mode and a full power mode, respectively.

20. The method of claim 18 wherein said step of causing said hand-held electronic device to operate in a second power consumption mode comprises:

applying power to a volatile memory device of said microcontroller; and writing data stored in a nonvolatile memory device of said hand-held electronic device to said volatile memory device.

21. The method of claim 18 further comprising:

applying said wake up signal to a host system connected to said hand-held electronic device and operating in a reduced power consumption mode for causing said host system to operate in a full power mode.

22. The method of claim 18 further comprising:

while said hand-held electronic device is operating in said second power consumption mode, monitoring user input via at least one input device connected to said microcontroller;

responsive to expiration of a predetermined time period in which no user input is detected, generating a second signal to said microcontroller;

responsive to said second signal, causing said hand-held electronic device to operate in said first power consumption mode.

* * * * *